Aug. 5, 1930.  R. HAUGAN  1,772,146
HAND PROPELLED SPEED SKIFF
Filed Feb. 27, 1929   3 Sheets-Sheet 1
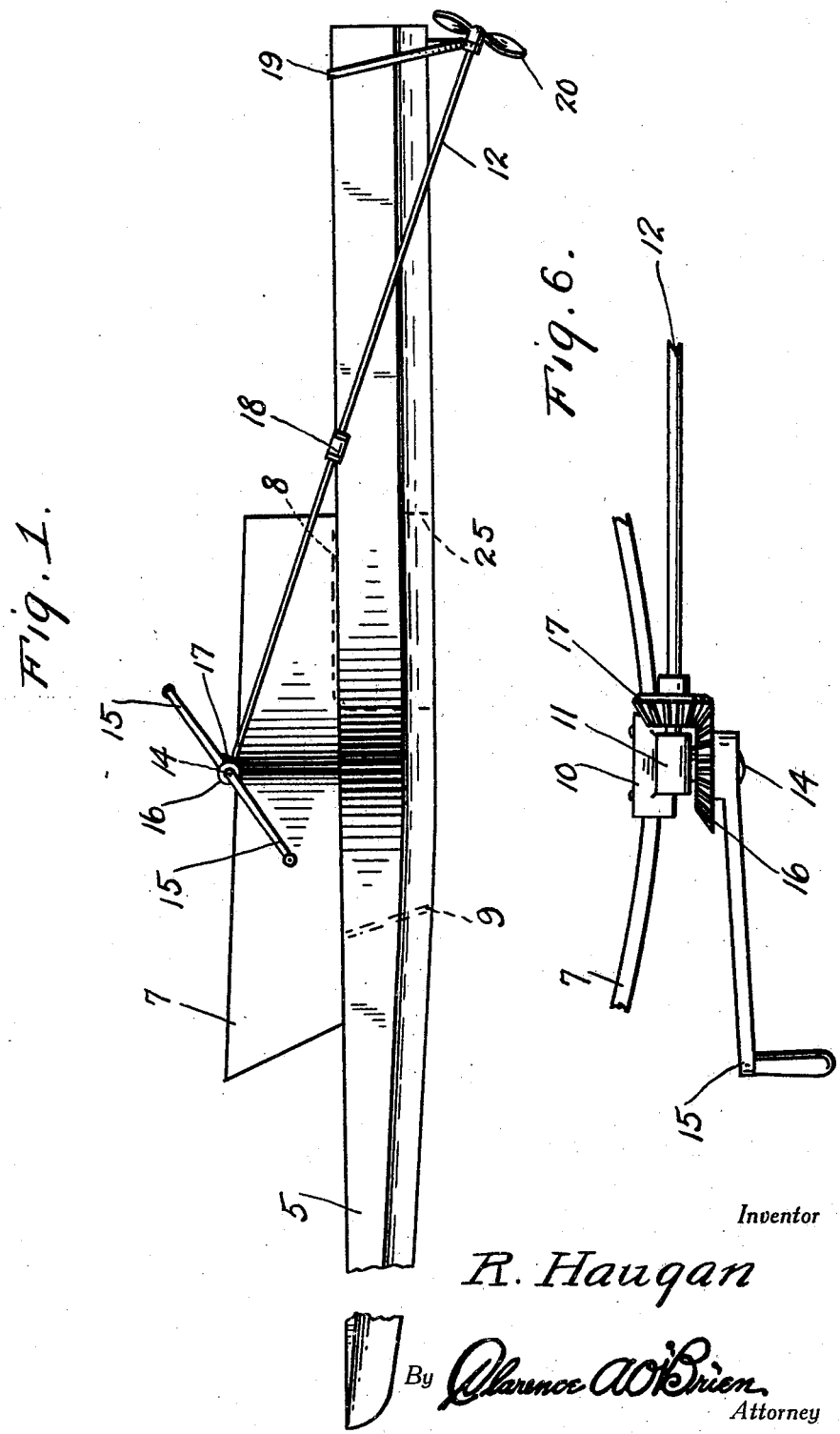
Inventor
R. Haugan
By Clarence A. O'Brien
Attorney Aug. 5, 1930.  R. HAUGAN  1,772,146
HAND PROPELLED SPEED SKIFF
Filed Feb. 27, 1929  3 Sheets-Sheet 2
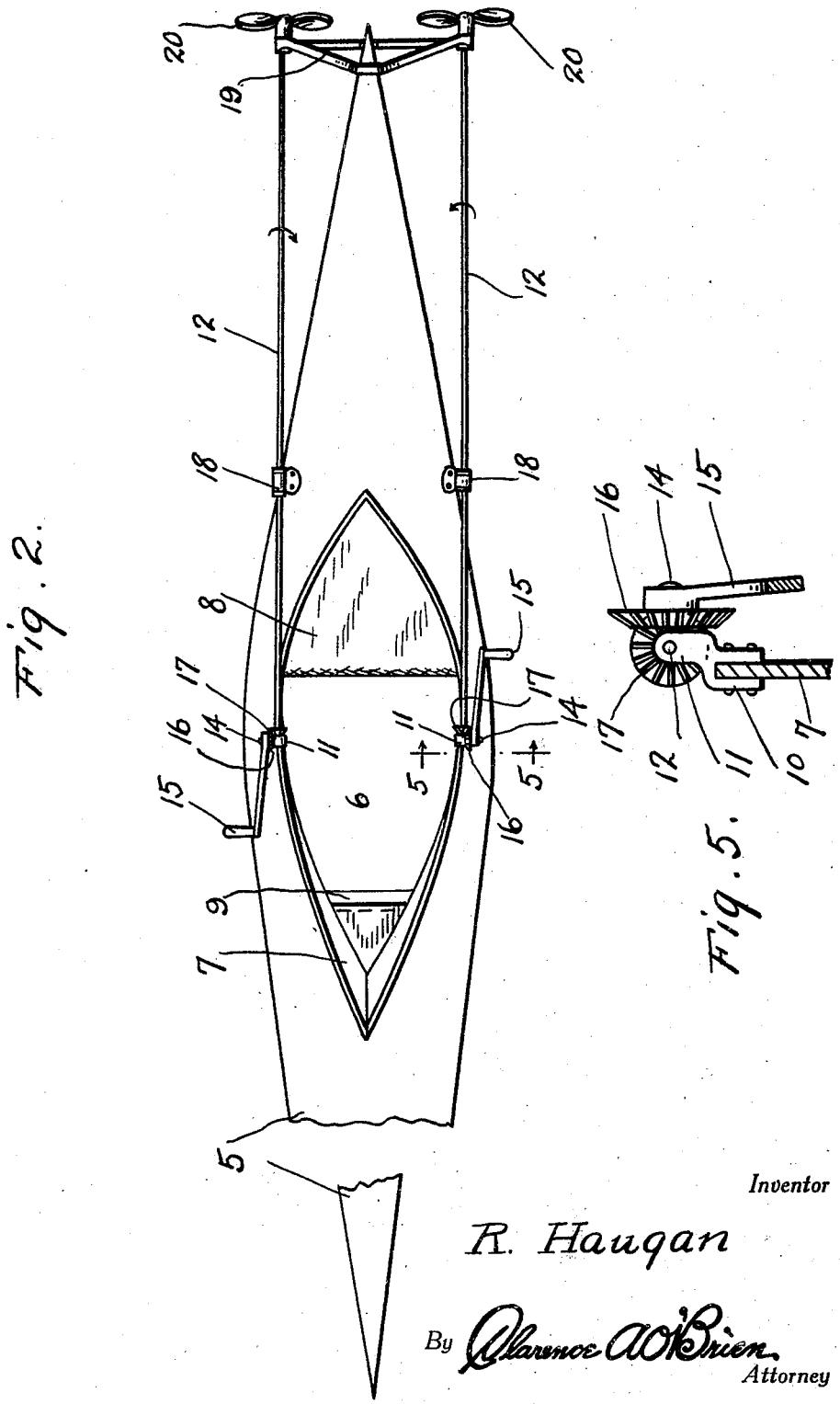
Inventor
R. Haugan
By Clarence A. O'Brien
Attorney

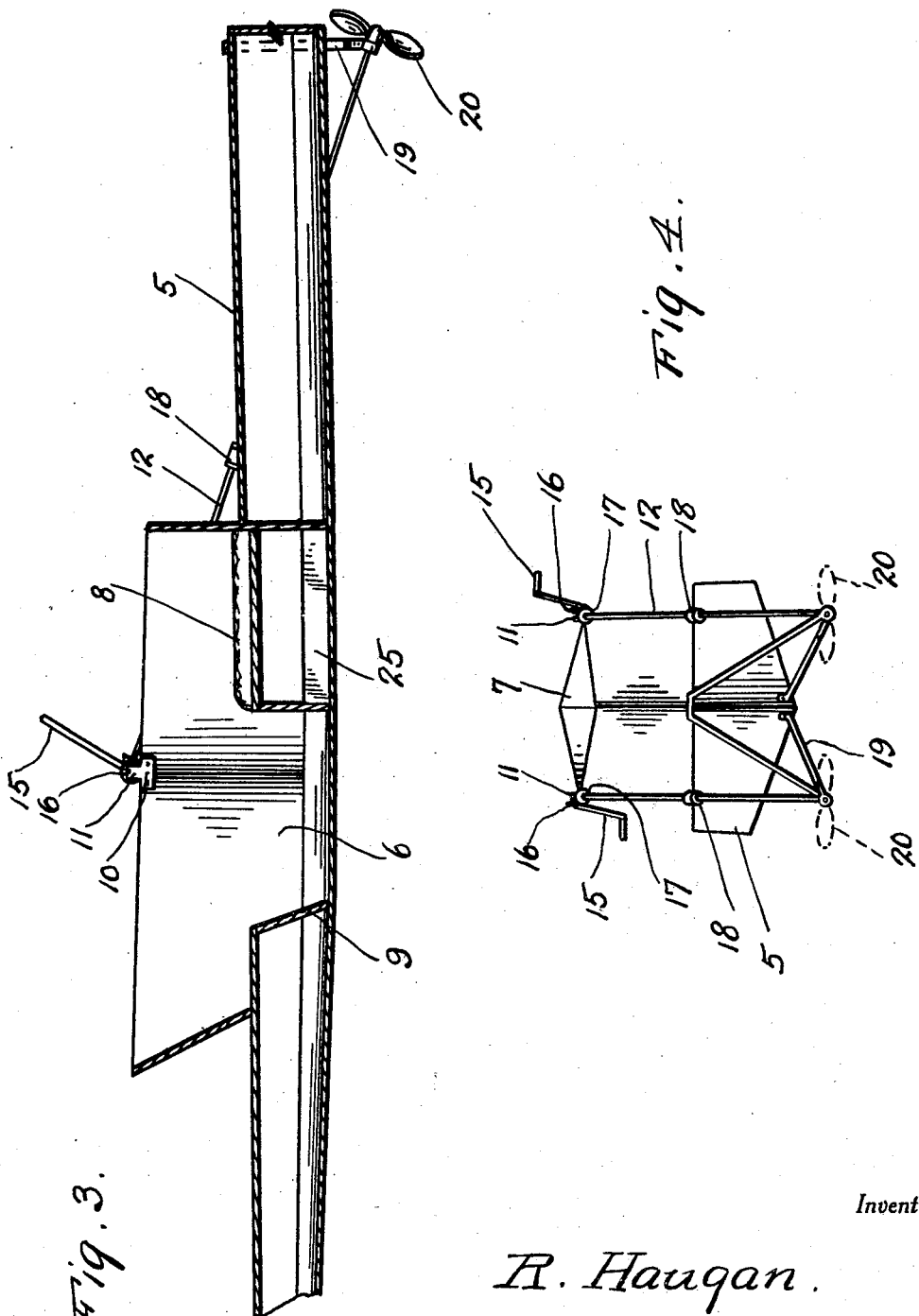

Patented Aug. 5, 1930

1,772,146

UNITED STATES PATENT OFFICE

REIDAR HAUGAN, OF WHITE SULPHUR SPRINGS, WEST VIRGINIA

HAND-PROPELLED SPEED SKIFF

Application filed February 27, 1929. Serial No. 343,045.

The present invention relates to a skiff which is hand propelled and built to attain relatively high speed in the water.

The prime object of the invention resides in the provision of a mechanism incorporated therein, whereby the skiff may be propelled by hand cranks operating propellers at the rear of the skiff.

Another very important object of the invention resides in the provision of hand operated propellers for the skiff which are so arranged whereby the skiff may be guided by the manipulation of said hand cranks alone.

A still further very important object of the invention resides in the provision of a skiff of this nature which is comparatively simple in its construction, strong and durable, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of the skiff embodying the features of my invention, Figure 2 is a top plan view thereof, Figure 3 is a vertical longitudinal section therethrough, Figure 4 is a rear elevation thereof, Figure 5 is a detail section taken substantially on the line 5—5 of Figure 2, and Figure 6 is an enlarged detail top plan view of one of the hand cranks and gearing associated therewith.

Referring to the drawings in detail it will be seen that the numeral 5 denotes generally the body of the skiff which is elongated and tapered forwardly and rearwardly and having the major portion of its top covered except to provide a passenger compartment 6 which has a flat board 7 built thereabout to form a compartment tapering forwardly and rearwardly.

Both the body 5 and the compartment 6 formed by the splash board 7 are stream line. A seat is disposed in the rear of the compartment 6 and a forwardly and upwardly inclined foot board 9 is located at the front end thereof.

Intermediate the ends of the sides of the splash board 7 there are located brackets 10 fastened securely in place in any suitable manner and having bearings 11 to receive the forward ends of shafts 12. Pintles 14 extend outwardly from the bearings 11 and have rotatable hand cranks 15 with gears 16 of the beveled type secured thereto and meshing with beveled pinions 17 on the shaft 12.

These shafts 12 incline downwardly and rearwardly having their intermediate portions journaled in bearings 18 on the sides of the stern part of the body 5 in rear of the compartment 6. Cross frame 19 is mounted at the rear end of the stern of the body 5 and receives the rear ends of the shafts 12 and on the rear extremities of these shafts are propellers 20.

This skiff differs from the ordinary rowing skull racer in the fact that the stern is heavier than the bow. The ordinary rowing skull racer can only travel on smooth water, such as lakes, rivers, etc., while this skiff can stand quite a choppy sea and is very seaworthy.

The splash board 7 fits close to the operator's body who is on the seat 8 so as to enable the operator to grasp the handles of the crank 15 from the outside of the splash board and this gives the arms ample freedom.

Every part of the skiff is airtight, except the compartment 6. No rudder is necessary as the craft can be controlled easily with the propeller. An important feature resides in the fact that when the craft floats in the water under full load, the water line will be only two or three inches from the deck and thus cuts off wind resistance to a great extent.

Another important feature is the fact that by using propellers, the rower loses no motion or power as is the case with oars or paddles. The angle of the propeller shaft 12 assists in pushing the stern up—the tendency of all skiffs being to dig down in the stern.

It is thought that the construction, operation, utility and advantages of this invention will now be quite apparent to those skilled in this art without a more detailed description thereof. It is preferable to provide suitable ballasts 25 under the seat 8.

This embodiment of the invention, however, has been disclosed in detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A water craft of the class described including an elongated stream line deck body having an intermediately located narrow passenger compartment therein and a splash board rising from the deck about the compartment so that said compartment is also stream line, propellers, a frame across the stern of the craft comprising oppositely extending pairs of converging arms having bearing eyes at the converging ends of each pair of arms, the free ends of one arm of each pair anchored to the hull of the craft adjacent its rear end and below the deck, the ends of the other arm of each pair having a horizontally disposed connecting portion extending across the deck and supported thereon, shafts journaled in said eyes on the frame and connected with the propellers, hand cranks on the sides of the splash board exteriorly of the compartment and operatively connected with the shaft, said shaft inclining downwardly and rearwardly.

In testimony whereof I affix my signature.

REIDAR HAUGAN.